US011871319B2

(12) United States Patent
Kim et al.

(10) Patent No.: US 11,871,319 B2
(45) Date of Patent: Jan. 9, 2024

(54) METHOD AND APPARATUS FOR PROVIDING EDGE COMPUTING SERVICE IN WIRELESS COMMUNICATION SYSTEM

(71) Applicant: Samsung Electronics Co., Ltd., Gyeonggi-do (KR)

(72) Inventors: Hyesung Kim, Gyeonggi-do (KR); Jicheol Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 12 days.

(21) Appl. No.: 17/740,915

(22) Filed: May 10, 2022

(65) Prior Publication Data

US 2022/0377515 A1  Nov. 24, 2022

(30) Foreign Application Priority Data

May 10, 2021 (KR) ........................ 10-2021-0060117

(51) Int. Cl.
| | | |
|---|---|---|
| *H04W 4/50* | (2018.01) | |
| *H04L 67/52* | (2022.01) | |
| *H04L 61/4511* | (2022.01) | |
| *H04L 67/51* | (2022.01) | |

(52) U.S. Cl.
CPC ........... *H04W 4/50* (2018.02); *H04L 61/4511* (2022.05); *H04L 67/51* (2022.05); *H04L 67/52* (2022.05)

(58) Field of Classification Search
CPC ..... H04W 4/50; H04W 88/18; H04L 61/4511; H04L 67/51; H04L 67/52; H04L 67/61;
(Continued)

(56) References Cited

U.S. PATENT DOCUMENTS

2010/0241715 A1* 9/2010 Takase ................ H04L 67/1001
709/206
2020/0404069 A1* 12/2020 Li ........................... H04W 8/24
(Continued)

FOREIGN PATENT DOCUMENTS

| KR | 1020200130043 | 11/2020 |
|---|---|---|
| KR | 1020210042753 | 4/2021 |

(Continued)

OTHER PUBLICATIONS

3GPP TS 23.558 (Apr. 2021) Architecture for enabling Edge Applications (Year: 2021).*
(Continued)

*Primary Examiner* — Sm A Rahman
(74) *Attorney, Agent, or Firm* — The Farrell Law Firm, P.C.

(57) ABSTRACT

The disclosure relates to a communication scheme for converging a $5^{th}$ generation (5G) system for supporting a higher data rate after a $4^{th}$ generation (4G) system with Internet of things (IoT) technology, and a system thereof. A wireless communication system, and more particularly, an application layer network structure for providing an edge computing device in a cellular wireless communication system (a 5G system), and a method thereof are provided. An edge enabler server (EES) receives a first message including information about one or more edge application servers (EASs) from an EAS management system, and transmits a second message for requesting instantiation for at least one EAS among the one or more EASs to the EAS management system, based on the information about the one or more EASs included in the first message. The information about the one or more EASs includes at least one of information about an identifier (ID) of each of the one or more EASs, information indicating whether each of the one
(Continued)

or more EASs supports instantiation, or instantiation type information for each of the one or more EASs.

20 Claims, 7 Drawing Sheets

(58) Field of Classification Search
CPC ..... H04L 69/40; H04L 67/60; H04L 61/5007; H04L 67/14
See application file for complete search history.

(56) References Cited

U.S. PATENT DOCUMENTS

| | | | |
|---|---|---|---|
| 2021/0112136 A1 | 4/2021 | Seo | |
| 2021/0112137 A1* | 4/2021 | Soloway | ............... H04L 67/568 |
| 2022/0124147 A1 | 4/2022 | Ge et al. | |

FOREIGN PATENT DOCUMENTS

| | | |
|---|---|---|
| KR | 10-2021-0136850 | 11/2021 |
| WO | WO 2020/259509 | 12/2020 |

OTHER PUBLICATIONS

3GPP TS 23.558 V2.1.0, 3GPP, 3rd Generation Partnership Project; Technical Specification Group Services and System Aspects; Architecture for Enabling Edge Applications; (Release 17), Apr. 2021, 152 pages.
International Search Report dated Aug. 8, 2022 issued in counterpart application No. PCT/KR2022/006468, 7 pages.

* cited by examiner

METHOD AND APPARATUS FOR PROVIDING EDGE COMPUTING SERVICE IN WIRELESS COMMUNICATION SYSTEM

CROSS-REFERENCE TO RELATED APPLICATION(S)

This application is based on and claims priority under 35 U.S.C. § 119 to Korean Patent Application No. 10-2021-0060117, filed on May 10, 2021, in the Korean Intellectual Property Office, the disclosure of which is incorporated herein by reference in its entirety.

BACKGROUND

1. Field

The disclosure relates to a method and apparatus for providing an edge computing service in a wireless communication system.

2. Description of the Related Art

In order to meet the increased demand for wireless data traffic since the $4^{th}$ generation (4G) communication system came to the market, there are ongoing efforts to develop enhanced $5^{th}$ generation (5G) communication systems or pre-5G communication systems. For this reason, the 5G communication system or pre-5G communication system is called a "beyond 4G network communication system" or "post LTE system".

For higher data transmit rates, 5G communication systems are considered to be implemented on ultra-high frequency hands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5G system including, e.g., hybrid frequency shift keying (FSK) and frequency quadrature amplitude modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The $3^{rd}$ generation partnership project (3GPP), responsible for the cellular mobile communication standards, has named a new core network structure 5G core (5GC) and is working on standardization of the 5GC in order to evolve from the legacy 4G long term evolution (LTE) system to the 5G system.

Compared to a network core for legacy 4G, evolved packet core (EPC), the 5GC supports the following differentiated functions.

First, network slicing is introduced in the 5GC. As a requirement of 5G, the 5GC should support various types of terminal types and services, which include, for example, enhanced mobile broadband (eMBB), ultra reliable low latency communications (URLLC), and massive machine type communications (mMTC). Each of these terminals/services has a different requirement for the core network. For example, the eMBB service requires a high data rate, and the URLLC service requires high stability and low latency. A technique that may satisfy these various service requirements is network slicing.

Network slicing is a technique of creating multiple logical networks by virtualizing one physical network. In network slicing, each network slice instance (NSI) may have a different characteristic. Accordingly, as each NSI has a network function (NF) suitable for its characteristic, various service requirements may be satisfied. Various 5G services may be efficiently supported by allocating an NSI suitable for the characteristics of a service requested by each terminal.

Secondly, the 5GC may facilitate the support of a network virtualization paradigm by separating a mobility management function (MMF) from a session management function (SMF). In the legacy 4G LTE, all terminals may receive services from a network by exchanging signaling with a single core device called a mobility management entity (MME) responsible for registration, authentication, mobility management, and session management functions. However, as the number of terminals drastically increases and mobility and traffic/session characteristics to be supported are subdivided according to the types of terminals in 5G, support of all functions in a single device such as the MME may inevitably reduce scalability. Accordingly, various functions are under development based on the structure in which the MMF and the SMF are separated from each other to improve scalability in terms of the function/implementation complexity and signaling load of a core device responsible for a control plane.

In the case where a procedure of obtaining information about whether dynamic instantiation for a specific edge application server (EAS) is supported and information about an instantiation trigger condition by an edge enabler server (EES) is not defined, when the EES calls a function of an EAS management system (e.g., an orchestrator, an edge platform manager, or an EAS lifecycle manager) whenever the demand for the EAS is predicted, unnecessary signaling may occur.

Moreover, when an EES provider and an EAS management system provider are different, there is a need for a procedure of providing an EES with information indicating whether the EAS management system allows/supports a dynamic instantiation function for a specific EAS.

SUMMARY

An aspect of an embodiment of the disclosure is to provide a procedure of obtaining information indicating whether dynamic instantiation for a specific EAS is supported and information about an instantiation trigger condition by an EES.

An embodiment of the disclosure is to provide a procedure of providing an EES with information indicating whether an EAS management system allows/supports a dynamic instantiation function for an EAS, when an EES provider and an EAS management system provider are different.

According to an embodiment, a method of an edge enabler server (EES) includes receiving, from an edge application server (EAS) management system, a first message including information about one or more EASs, and transmitting, to the EAS management system, a second message for requesting instantiation for at least one EAS among the one or more EASs, based on the information about the one or more EASs included in the first message. The information about the one or more EASs includes at least one of information about an identifier (ID) of each of the one or more EASs, information indicating whether each of the one or more EASs supports instantiation, or instantiation type information for each of the one or more EASs.

According to an embodiment, a method of an edge application server (EAS) management system includes transmitting, to an edge enabler server (EES), a first message including information about one or more EASs, and receiving, from the EES, a second message for requesting instantiation for at least one EAS among the one or more EASs, based on the information about the one or more EASs. The information about the one or more EASs includes at least one of information about an ID of each of the one or more EASs, information indicating whether each of the one or more EASs supports instantiation, or instantiation type information for each of the one or more EASs.

According to an embodiment, an edge enabler server (EES) includes a transceiver and at least one processor. The at least one processor is configured to control the transceiver to receive, from an edge application server (EAS) management system, a first message including information about one or more EASs, and control the transceiver to transmit, to the EAS management system, a second message requesting instantiation for at least one EAS among the one or more EASs, based on the information about the one or more EASs included in the first message. The information about the one or more EASs includes at least one of information about an identifier (ID) of each of the one or more EASs, information indicating whether each of the one or more EASs supports instantiation, or instantiation type information for each of the one or more EASs.

According to an embodiment, an edge application server (EAS) management system includes a transceiver and at least one processor. The at least one processor is configured to transmit, to an edge enabler server (EES), a first message including information about one or more EASs, and receive, from the EES, a second message for requesting instantiation for at least one EAS among the one or more EASs, based on the information about the one or more EASs. The information about the one or more EASs includes at least one of information about an ID of each of the one or more EASs, information indicating whether each of the one or more EASs supports instantiation, or instantiation type information for each of the one or more EASs.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Embodiments of the disclosure are described below in detail with reference to the accompanying drawings. A detailed description of a generally known function or structure of the disclosure will be avoided lest it should obscure the subject matter of the disclosure. Although the terms as described later are defined in consideration of functions in the disclosure, the terms may be changed according to the intention of a user or an operator, or customs. Therefore, the definitions should be made, not simply by the actual terms used, but by the meanings of each term lying within.

A base station (BS), which is an entity that allocates resources to a terminal, may be at least one of an evolved Node B (eNode B), a Node B, a radio access network (RAN), an access network (AN), a RAN node, a radio access unit, a base station controller, or a network node. A terminal may include a user equipment (UE), a mobile station (MS), a cellular phone, a smart phone, a computer, or a multimedia system capable of performing a communication function. A downlink (DL) may refer to a radio transmission path of a signal transmitted from a BS to a UE, and an uplink (UL) may refer to a radio transmission path of a signal transmitted from the UE to the BS.

While an embodiment will be described below in the context of a post LTE system by way of example, various embodiments may be applied to other communication systems having a similar technical background or channel type. Further, those skilled in the art will understand that various embodiments of the disclosure may be applied to other communication systems (e.g., an LTE or LTE-advanced (LTE-A) system) with some modifications made without departing from the scope of the disclosure.

Figure 1:
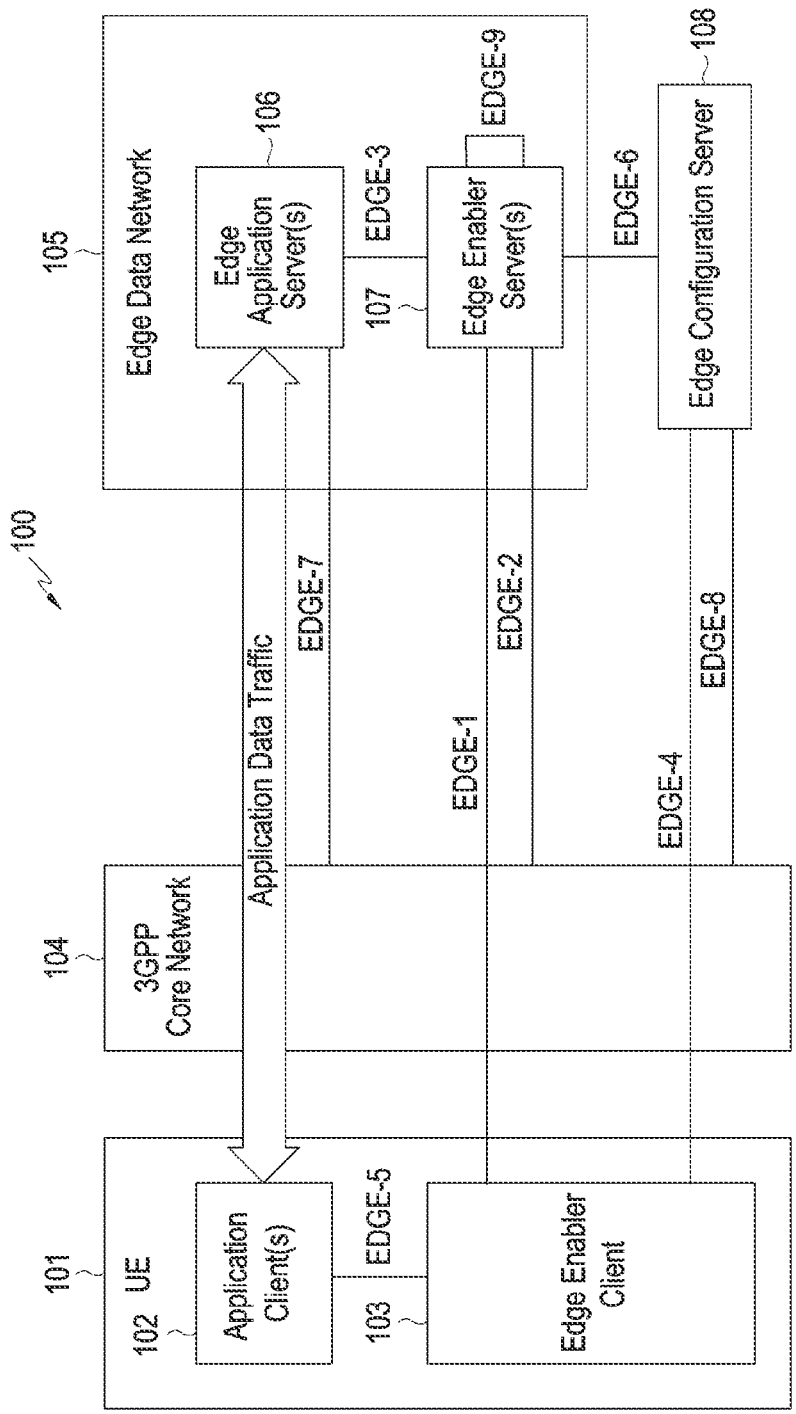
FIG. 1 illustrates an application layer network structure and interfaces supporting edge computing, according to an embodiment.

FIG. 1 illustrates an application layer network structure and interfaces supporting edge computing, according to an embodiment.

Referring to FIG. 1, a terminal, for example, a UE 101 may include at least one application client (AC) 102 and an edge enabler client (EEC) 103. The AC 102 may be an application-level client for providing an edge computing service to a user, when an edge computing service is provided.

Further, the UE 101 may include a communication processor (CP) for communicating with another wireless communication network, for example, one or more mobile communication networks.

A 3GPP core network 104 is provided as a representative mobile communication network, and may include, for example, an evolved packet core (EPC) and/or a 5GC. The 3GPP core network 104 may include BSs that communicate directly with the UE 101 over the air (OTA), and higher core network components. When the 3GPP core network 104 includes the 5GC, the 3GPP core network 104 may include an access and mobility management function (AMF), a session management function (SMF), a policy control function (PCF), a user plane function (UPF), and so on.

In addition, when the 3GPP core network 104 includes the EPC, the 3GPP core network 104 may include network nodes corresponding to the 5GC.

Edge data networks may be implemented by network slicing, and all edge data networks may be configured to be the same type. The configuration of one edge data network 105 will be taken for example. The edge data network 105 may include an edge hosting platform, and include an edge enabler server (EES) 107, an edge application server (or edge application) (EAS) 106, and an orchestrator for the edge hosting platform. There may be at least one EES 107 and at least one EAS 106. The EES 107 may include an edge enabler client manager, an edge enabler platform, and an edge enabler application programming interface (API) server.

Network functions may be defined as follows, some of which are illustrated in FIG. 1.

3GPP core network 104: It may include a 3GPP RAN and a core network.

At least one edge data network 105: A 5GC data network or an EPC packet data network. This may be a data network including functions for providing edge computing services, such as an edge hosting platform and an EES.

At least one AC 102: An application program running on a mobile operating system (OS) of the UE 101, which may be identified by an application identifier (ID) in the 5GC, and in an environment providing a mobile OS, the AC may be identified by an OS ID and a unique application ID (OSAppID) for each OS.

At least one EAS 106: An application server program running in a virtual machine (VM) image or a virtualized container operated in an edge hosting environment. This may be a server program executed by instantiation of the VM image, and called an edge application.

Edge configuration server (ECS) 108: A server that provides configuration information about the edge data network 105 to the UE 101, which may be an initial access server from which the UE 101 may receive configuration information to receive a mobile edge computing (MEC) service.

Edge hosting platform: Platform software including a virtualization layer capable of executing a plurality of edge application programs. The edge hosting platform may be used in the same context as an edge hosting environment.

Orchestrator for edge hosting platform: A management system for managing the edge hosting platform and the life cycles of edge application programs operating on the edge hosting platform. It may perform the function of an orchestrator defined by the European telecommunication standards institute management and network operation (ETSI MANO).

EES 107: A server for providing edge computing services. The EES 107 may be a server that performs an operation as an edge enabler client manager providing the UE 101 with a list of application programs available on the edge hosting platform, manages setting information for edge application programs running on the edge hosting platform, and provides an application programming interface (API) for functions provided to edge application programs by the 3GPP network.

EEC 103: A software module of the UE 101, which may be a software agent with functions for providing edge computing services. The EEC 103 may perform an authentication function for accessing the edge computing server of a UE, a function of obtaining access information about the edge data network 105 and the EES 107 in conjunction with the ECS 108, and a function of routing traffic of the at least one AC 102 in the UE to the at least one EAS 106 based on information about the at least one EAS 106.

The application network structure for supporting edge computing, illustrated in FIG. 1, may be managed by an edge computing operator separate from a mobile communication operator, and thus a plurality of separate edge computing operators may exist in one mobile communication operator network. The application layer network structure for supporting edge computing, illustrated in FIG. 1, may support the configuration of such an operator.

The application layer network structure disclosed in FIG. 1 may support a plurality of edge computing operators in one mobile communication network. The application layer network structure may transmit, to a UE, configuration information for accessing a plurality of edge computing service providers available in one mobile communication network and edge computing networks deployed by the operators.

The application layer network structure disclosed in FIG. 1 may transmit, to the UE, configuration information for accessing an edge network service provider selected by a mobile communication operator from among the plurality of edge computing operators existing in the single mobile communication network, and an edge computing network deployed by the selected edge network service provider.

Figure 2:
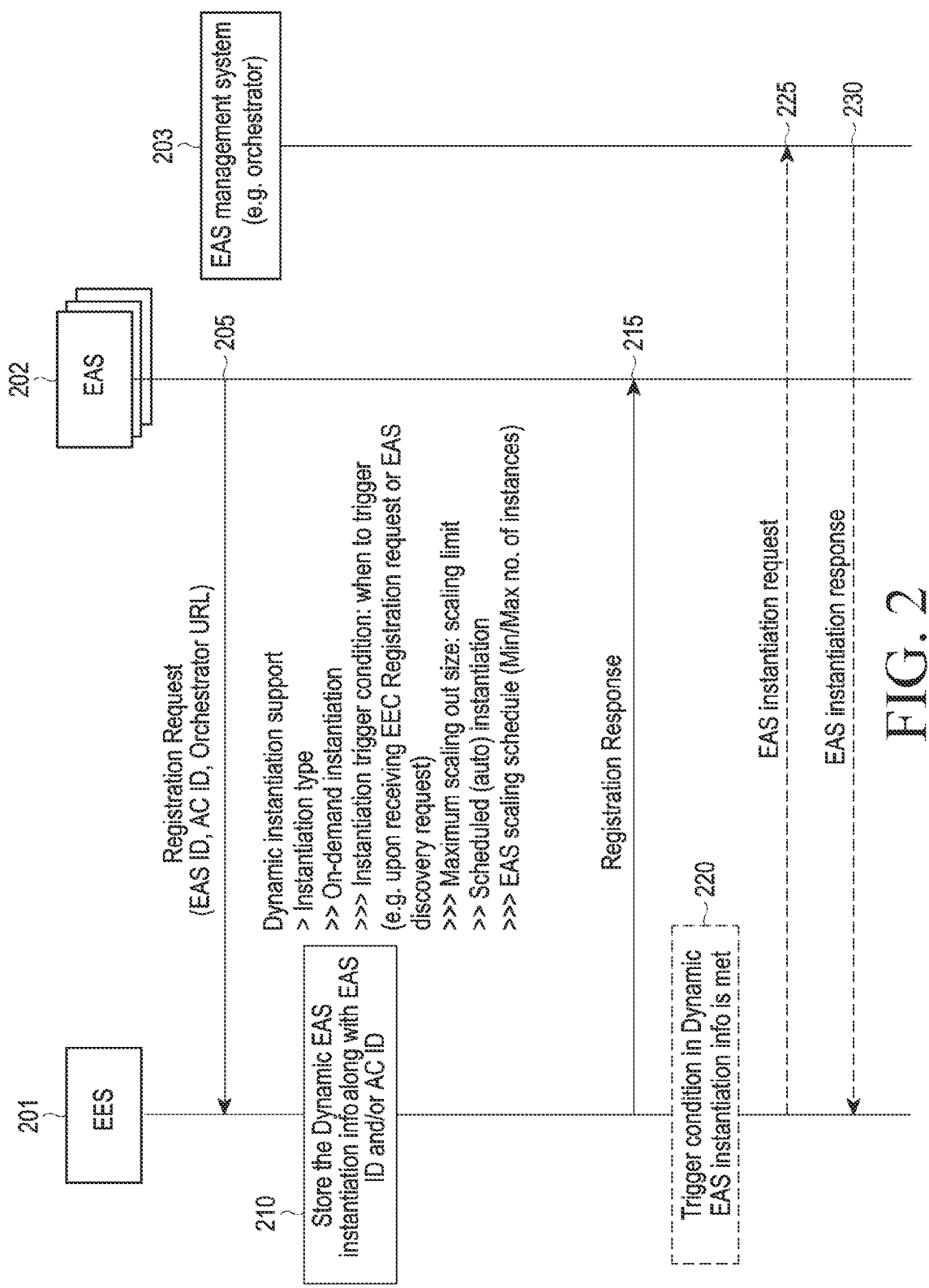
FIG. 2 illustrates a procedure of providing dynamic edge application server (EAS) instantiation information to an edge enabler server (EES) by an EAS, according to an embodiment.

FIG. 2 illustrates a procedure of providing dynamic instantiation information to an EES 201 by an EAS 202, according to an embodiment.

The operation of the EAS 202 illustrated in FIG. 2 may be performed by one or more EASs.

Referring to FIG. 2, in step 205, the EAS 202 may transmit an EAS registration request message including dynamic EAS instantiation information to the EES 201. The dynamic EAS instantiation information may include at least one of the following pieces of information:

Dynamic instantiation support indication: Indicates whether dynamic instantiation is supported for the EAS. It may be determined whether dynamic instantiation is supported for the EAS according to whether an EAS management system (e.g. an orchestrator, an EAS lifecycle manager, or an EAS platform manager) supports the function, or according to a dynamic instantiation policy and/or condition based on a service level agreement between an EAS provider and an EAS management system provider.

Instantiation type information and additional information according to instantiation type: Indicates information about an instantiation type supported for the EAS. For example, the instantiation type may include an on-demand type in which EAS instantiation is additionally performed according to real-time demand prediction, or a scheduled auto scaling type in which an EAS instance is scaled out or scaled in according to a predetermined schedule. Additional information for each instantiation type is given as follows:

On-Demand Type

Instantiation trigger condition (trigger policy): includes condition(s) on when to transmit a request for EAS instantiation to the EAS management system. For example, the instantiation trigger condition may include at least one of the following conditions:

When an EEC registration request is received: When the EES receives an EEC registration request message from the EEC, EAS-related information (e.g., AC profile information) is included in the received EEC registration request message, and an EAS may be specified from the EAS-related information, the EES transmits an instantiation request message for the specified EAS to the EAS management system (that is, triggers an EAS instantiation procedure).

When an EAS discovery request is received: When the EES receives an EAS discovery request message from the EEC, and an EAS may be specified from information included in the received EAS discovery request message (e.g., EAS discovery filter information including an AC ID), the EES transmits an instantiation request message for the specified EAS to the EAS management system.

When an AC state report is received: When the EES receives an AC state report message from the EEC and obtains AC state information included in the received AC state report message, and an AC is in a specific state, the EES transmits an instantiation request message for a corresponding EAS to the EAS management system. For example, the AC state report message may include at least one of the following pieces of information:
- Information about an installed AC
- Information about an AC which will start to be driven (foreground)
- Information about a generated AC DNS query
- Information about generated AC application traffic Max scaling out size maximum degree of instantiation): In the case of EAS instantiation, it indicates information about the maximum number of possible instances and has a scaling-out limit value. The value may be expressed as the number of the UE or an AC in the UE.

Termination trigger condition: Contrary to the instantiation trigger condition, it indicates a condition for removal/ termination of an EAS instant. For example, the termination trigger condition may include at least one condition of reception of an EAS de-registration message from the EEC by the EES, EAS de-registration according to expiration of an EAS registration timer, or termination according to expiration of a termination trigger timer. In addition, the termination trigger condition may include an indication instructing the EES to transmit an EAS termination request message to the EAS management system, when no EEC is currently registered in the EES, or all registered EEC(s) are in an unregistered state (e.g., an EEC de-registration procedure is performed, or an event of expiration of an EEC registration-related expiration timer occurs). Upon receipt of a termination trigger condition, the EES transmits the EAS termination request message to the EAS management system, when the condition is satisfied.

Scheduled Auto Scaling

EAS scaling schedule information: Indicates a may number of EAS instants (e.g., a maximum/minimum auto scaling group size) and the number of EAS instants driven over time.

EAS instantiation state information: Indicates information about the current instantiation-related state of the EAS and may be included in an EAS profile. For example, the EAS instantiation state information may include at least one of the following pieces of state information.

On-board state: A state shortly before the EAS is driven to provide a service, in which no EAS instance is generated. In the on-board state, there is no EAS instance yet, and address information about the EAS may be provided as a fully qualified domain name (FQDN) type.

Enabled for instantiation state (or enabled for auto scaling out state): A state in which the EAS is currently ready to be instantiated, in which when the EAS transmits an instantiation request to the EAS management system, an EAS instance may be (additionally) generated. When there is no EAS instance in the enabled for instantiation state, address information about the EAS may be provided as an FQDN type. When at least one generated EAS instance exists in the enabled for instantiation state and additional EAS instantiation is possible, address information about the EAS may be provided as an IP address.

Instantiated for service state: A state in which an EAS instance has been generated. In the instantiated for service state, EAS endpoint information may be provided as an IP address.

EAS management system information: Includes information about the EAS management system required for the EES to perform an EAS instantiation trigger operation. For example, the EAS management system information may include information (e.g., address information such as a uniform resource identifier (URI)) about an API that should be called to transmit a request for corresponding EAS instantiation. The API refers to an interface provided by the EAS management system (e.g., the orchestrator, edge platform manager, or EAS lifecycle manager). Even through the EAS does not separately provide information about the API, the information may be configured locally in the EES, or the EES may obtain the information from a common API framework core function.

The EAS registration request message may include at least one of an EAS identifier (ID), which is an ID of the EAS 202, or information about an AC to which the EAS 202 provides a service, that is, an AC profile (e.g., an AC ID).

Referring again to FIG. 2, in step 210, the EES 201 may store the dynamic EAS instantiation information and the EAS ID and/or the AC ID included in the EAS registration request message. For example, the EES 201 may store the dynamic EAS instantiation information by mapping it to the EAS ID or the AC ID. When the dynamic EAS instantiation information includes an instantiation trigger condition, the EES 201 may perform an additional operation for detecting the condition. For example, when the instantiation trigger condition includes a condition for the case in which an AC state report is received, the EES 201 may transmit an AC state information request message to an EEC, and instruct the EEC to periodically report AC state information to the EES 201. Further, when the EES 201 receives a termination trigger condition from the EAS 202, and the termination trigger condition includes a condition for the case of termination based on expiration of a termination trigger timer, the EES may start the termination trigger timer after the EAS 202 is instantiated.

In step 215, the EES 201 processes the dynamic EAS instantiation information received from the EAS 202 as in step 210, and then transmits an EAS registration response message to the EAS 202.

In step 220, the EES 201 detects occurrence of an event that satisfies an instantiation trigger condition included in the EAS registration request message received in step 210. For example, when the instantiation trigger condition includes reception of an EEC registration request message, the EES 201 may determine whether the EEC registration request message has been received from an EEC. Upon receipt of the EEC registration request message from the EEC, the EES 201 may determine whether EAS-related information (e.g., AC profile information) is included in the EEC registration request message, and an EAS may be specified from the EAS-related information. In addition, when the instantiation trigger condition includes reception of an EAS discovery request, the EES 201 may determine whether the EAS discovery request message has been received from the EEC. Upon receipt of the EAS discovery request message from the EEC, the EES 201 may determine whether an EAS may be specified from information (e.g., EAS discovery filter information including an AC ID) included in the request message. In addition, when the instantiation trigger condition includes reception of an AC state report message, the EES 201 may determine whether the AC state report message has been received from the EEC. Upon receipt of the AC state report message from the EEC, the EES 201 may obtain AC state information included in the received AC state report message and determine whether an AC is in a specific state.

In step 225, upon occurrence of an event that satisfies the instantiation trigger condition included in the received. EAS registration request message, the EES 201 transmits an EAS instantiation request message to an EAS management system 203 (e.g., an orchestrator, an edge platform manager, or an EAS lifecycle manager). The EAS instantiation request message may include the EAS ID and/or the AC ID to be instantiated and the satisfied instantiation trigger condition. The EES 201 may transmit the EAS instantiation request message to the EAS management system 203, only for the EAS 202 for which dynamic instantiation is allowed/supported in step 210. For example, when the EES 201 receives an EAS discovery request message for EAS for which dynamic instantiation is not supported from an EEC or the EAS, and the EAS has not been instantiated, the EES 201 may explicitly indicate EAS discovery failure in a response message to the EAS discovery request, without transmitting an EAS instantiation request message to the EAS management system 203.

In step 230, the EAS management system 203 identifies the EAS instantiation request message received from the EES 201, and generates a necessary EAS instance based on the EAS instantiation request message. Further, the EAS management system 203 transmits an EAS instantiation response message including information about a corresponding result (e.g., whether the instantiation is successful, the EAS ID for which the instantiation is successful, the size or number of EAS instances, and a failure cause code in case of instantiation failure) to the EES 201.

Figure 3:
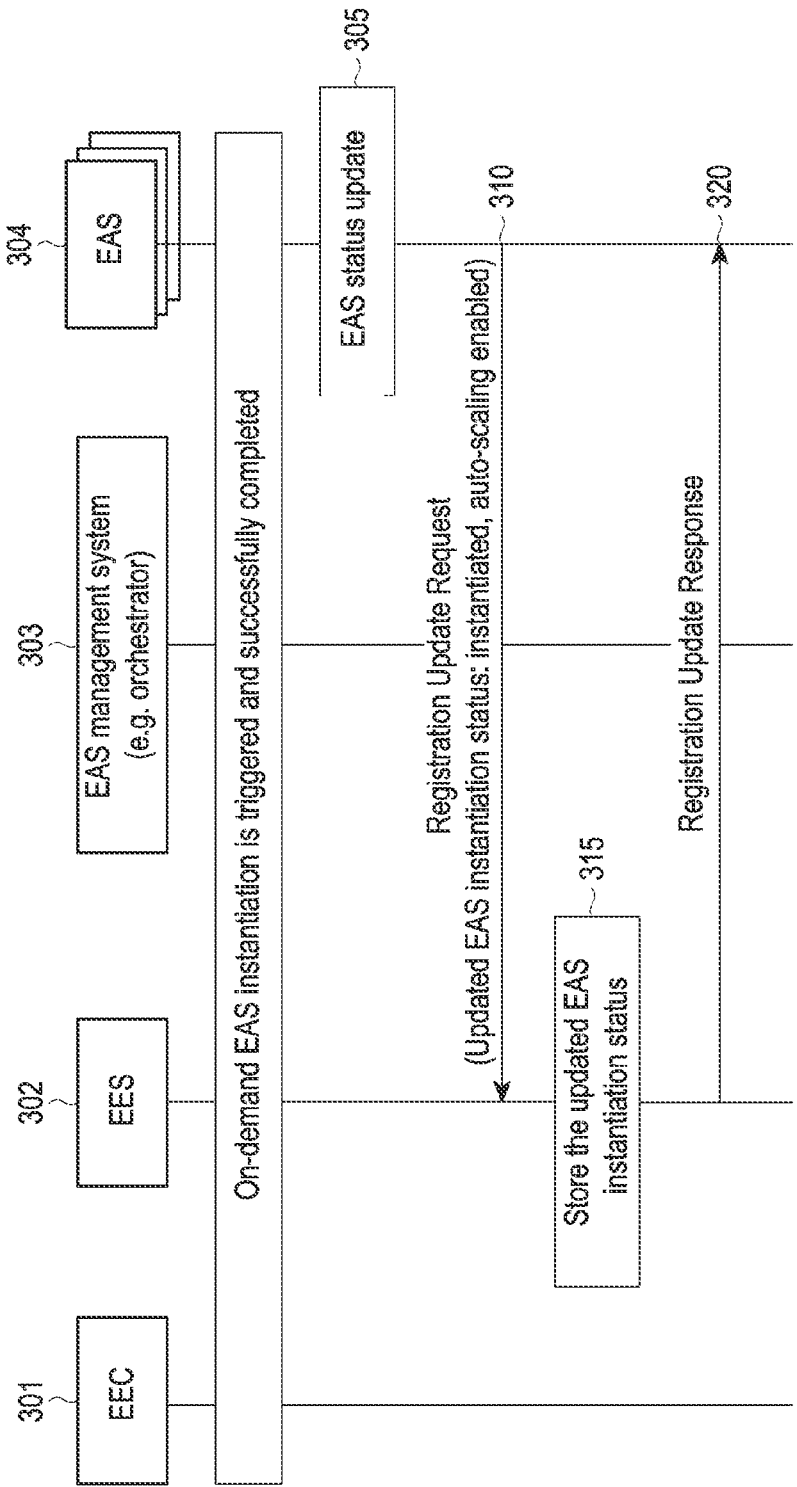
FIG. 3 illustrates a procedure of updating EAS registration after EAS instantiation is performed, according to an embodiment.

FIG. 3 illustrates a procedure of updating EAS registration after EAS instantiation is performed, according to an embodiment.

Referring to FIG. 3, after instantiation is successfully performed for an EAS 304 (e.g., after EAS instantiation of an on-demand type as an instantiation type is triggered, and the instantiation is successfully performed for the EAS 304), the EAS 304 updates EAS instantiation state information in step 305.

In step 310, the EAS 304 transmits an EAS registration update request message including the updated EAS instantiation state information to an EES 302. The EAS registration update request message transmitted to the EES 302 by the EAS 304 may include the updated EAS instantiation state information. For example, when an EAS instance is successfully generated for the EAS 304, and an IP address is assigned as endpoint information about the EAS 304, the EAS registration update message may include "instantiated for service" state information as the updated EAS instantiation state information together with the IP address as the endpoint information about the EAS 304. When it is possible to additionally generate an EAS instance for the EAS 304, the EAS registration update message may include "enabled for instantiation" state information or "enabled for auto scaling out" state information as the updated EAS instantiation state information.

Whenever dynamic EAS instantiation information is updated, the EAS 304 may provide the changed dynamic EAS instantiation information and/or EAS instantiation state information to the EES 302 by the EAS registration update request message.

In step 315, the EES 302 stores the updated EAS instantiation state information included in the EAS registration update request message received from the EAS 304. When detecting a demand for the EAS 304 later based on the received updated EAS instantiation state information (e.g., when receiving an EEC registration request message or an EAS discovery request message), the EFS 302 may determine whether to perform an EAS instantiation trigger operation (e.g., whether to transmit an EAS instantiation request message to an EAS management system 303). In addition, when the updated dynamic EAS instantiation information is included in the EAS registration update message received from the EAS 304, the EES 302 may update a previous stored instantiation and/or termination trigger condition for the EAS 304 based on the updated dynamic EAS instantiation information.

In step 320, the EES 302 transmits an EAS registration update response message to the EAS 304 to notify that the EAS registration update has been successfully performed.

Figure 4:
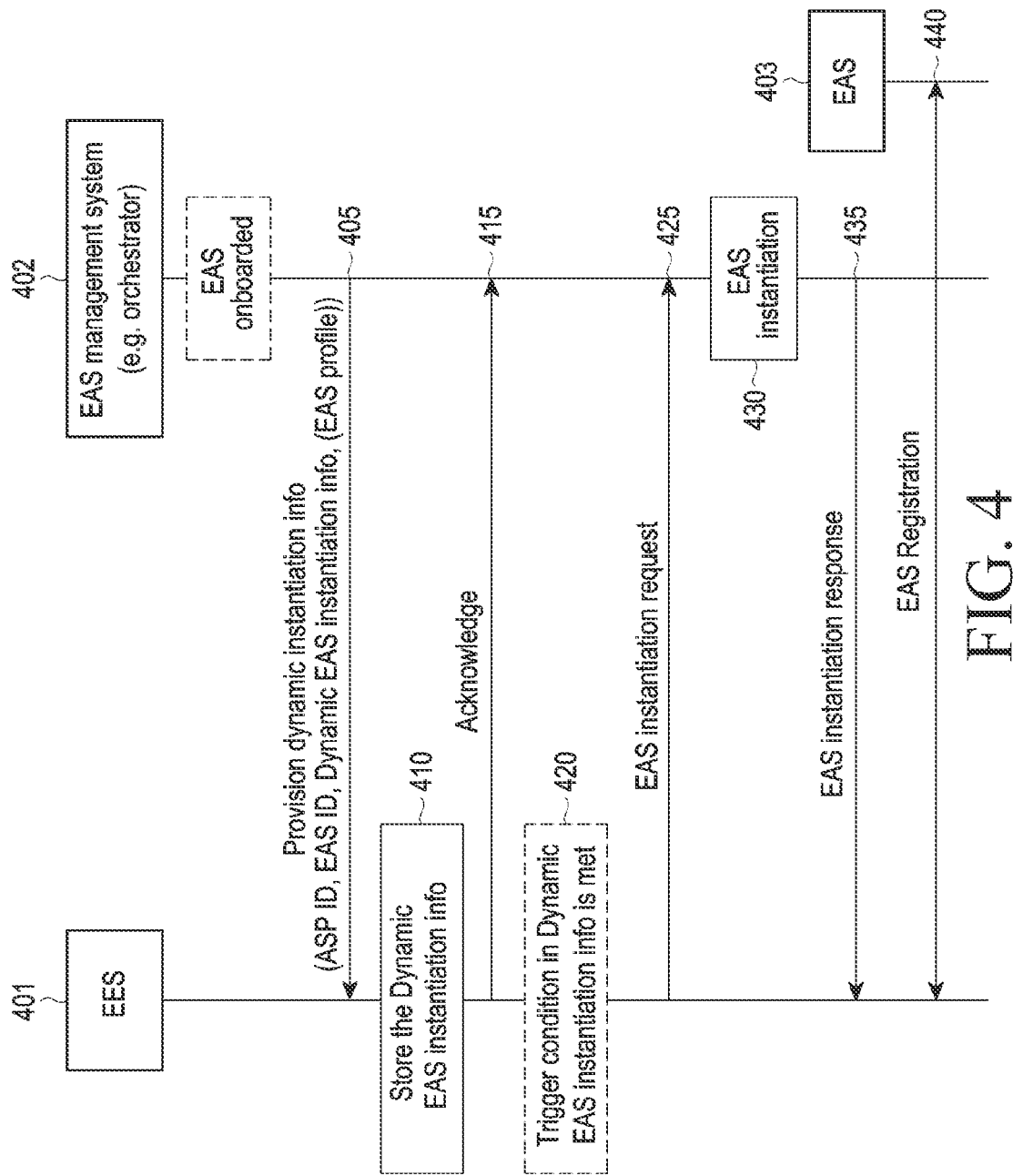
FIG. 4 illustrates a procedure of providing dynamic EAS instantiation information to an EES by an EAS management system, according to an embodiment.

FIG. 4 illustrates a procedure of providing dynamic EAS instantiation information to an EES by an EAS management system according to an embodiment.

Referring to FIG. 4, in step 405, the EAS management system 402 (e.g., an orchestrator, an edge platform manager, or an EAS lifecycle manager) transmits a provision dynamic instantiation information message to the EES 401. For example, when an EAS instantiation state is an on-board state, the EAS management system 402 may transmit the provision dynamic instantiation information message to the EES 401. The provision dynamic instantiation information message transmitted to the EES 401 by the EAS management system 402 may include dynamic instantiation information for an EAS (or dynamic EAS instantiation information). The EES 401 may determine an EAS for which dynamic instantiation is possible, based on information included in the provision dynamic instantiation information message received from the EAS management system 402. The provision dynamic instantiation information message transmitted to the EES 401 by the EAS management system 402 may include at least one of the following pieces of information.

Information about EAS list supporting dynamic instantiation function: It may include a list of EAS IDs that support a dynamic instantiation function provided by the EAS management system. In addition, the following information may also be provided for each EAS specified by an EAS ID.

Dynamic instantiation support indication: Indicates whether dynamic instantiation is supported for the EAS. It may he determined whether dynamic instantiation is supported for the EAS according to whether an EAS management system (e.g. an orchestrator, an EAS lifecycle manager, or an EAS platform manager) supports the function, or according to a dynamic instantiation policy and/or condition based on a service level agreement between an EAS provider and an EAS management system provider.

Instantiation type information and additional information according to instantiation type: Indicates information about an instantiation type supported for the EAS. For example, the instantiation type may include an on-demand type in which EAS instantiation is additionally performed according to real-time demand prediction, or a scheduled auto scaling type in which an EAS instance is scaled out or scaled in according to a predetermined schedule. Additional information for each instantiation type is given as follows:

On-Demand Type

Instantiation trigger condition (trigger policy): includes condition(s) on when to transmit a request for EAS instantiation to the EAS management system. For example, the instantiation trigger condition may include at least one of the following conditions:

When an EEC registration request is received: When the EES receives an EEC registration request message from the EEC, EAS-related information (e.g., AC profile information) is included in the received EEC registration request message, and an EAS may be specified from the EAS-related information, the EES transmits an instantiation request message for the specified EAS to the EAS management system (that is, triggers an EAS instantiation procedure).

When an EAS discovery request is received: When the EES receives an EAS discovery request message from the EEC, and an EAS may be specified from information included in the received EAS discovery request message (e.g., EAS discovery filter information including an AC ID), the EES transmits an instantiation request message for the specified EAS to the EAS management system.

When an AC state report is received: When the EES receives an AC state report message from the EEC and obtains AC state information included in the received AC state report message, and an AC is in a specific state, the EES transmits an instantiation request message for a corresponding EAS to the EAS management system. For example, the AC state report message may include at least one of the following pieces of information:
- Information about an installed AC
- Information about an AC which will start to be driven (foreground)
- Information about a generated AC DNS query
- Information about generated AC application traffic Max scaling out size (maximum degree of instantiation): In the case of EAS instantiation, it indicates information about the maximum number of possible instances and has a scaling-out limit value. The value may be expressed as the number of the UE or an AC in the UE.

Termination trigger condition: Contrary to the instantiation trigger condition, it indicates a condition for removal/termination of an EAS instant. For example, the termination trigger condition may include at least one condition of reception of an EAS de-registration message from the EEC by the EES, EAS de-registration according to expiration of an EAS registration timer, or termination according to expiration of a termination trigger timer. Upon receipt of a termination trigger condition, the EES transmits the EAS termination request message to the EAS management system, when the condition is satisfied.

Scheduled Auto Scaling

EAS scaling schedule information: Indicates a maximum/minimum number of EAS instants (e.g., a maximum/minimum auto scaling group size) and the number of EAS instants driven over time.

EAS instantiation state information: indicates information about the current instantiation-related state of the EAS. For example, the EAS instantiation state information may include at least one of the following pieces of state information:

On-board state: A state shortly before the EAS is driven to provide a service, in which no EAS instance is generated. In the on-board state, there is no EAS instance yet, and address information about the EAS may be provided as an FQDN type.

Enabled for instantiation state (or enabled for auto scaling out state): A state in which the EAS is currently ready to be instantiated, in which when the EAS transmits an instantiation request to the EAS management system, an EAS instance may be (additionally) generated. When there is no EAS instance in the enabled for instantiation state, address information about the EAS may be provided as an FQDN type. When at least one generated EAS instance exists in the enabled for instantiation state and additional EAS instantiation is possible, address information about the EAS may be provided as an IP address.

Instantiated for service state: A state in which an EAS instance has been generated. EAS endpoint information may be provided as an IP address.

EAS management system information: Includes information about the EAS management system required for the EES to perform an EAS instantiation trigger operation. For example, the EAS management system information may include information (e.g., address information such as a URI) about an API that should be called to transmit a request for corresponding EAS instantiation. The API refers to an interface provided by the EAS management system. The EAS management system may provide only information about a common API framework core function without separately providing information about the API to the EES.

The provision dynamic instantiation information message may further include at least one of an EAS ID, an application service provider (ASP) ID (e.g., an ID of a provider that provides the EAS and provides application services through the EAS), or an EAS profile (e.g., an FQDN or IP address as EAS address information, an AC ID for which the EAS is capable of providing a service, an EAS service area, and so on).

In step 410, the EES 401 stores the dynamic EAS instantiation information included in the provision dynamic instantiation information message. For example, the EES 401 stores the dynamic EAS instantiation information by mapping it to the EAS ID or the AC ID. When an instantiation trigger condition is included in the dynamic EAS instantiation information, the EES 401 may perform an additional operation for detecting the condition. For example, when the instantiation trigger condition includes a condition for the case in which an AC state report is received, the EES 401 may transmit an AC state information request message to an EEC, and instruct the EEC to periodically report AC state information to the EES 401. Further, when the EES 401 receives a termination trigger condition from the EAS management system, and the termination trigger condition includes a condition for the case of termination based on expiration of a termination trigger timer, the EES 401 may start the termination trigger timer after an EAS 403 is instantiated. When dynamic EAS instantiation information configured locally exits in the EES 401 or there is dynamic EAS instantiation information received from the EAS, the EES 401 may apply the dynamic EAS instantiation information received from the EAS management system 402, with priority.

In step 415, the EES 401 transmits an acknowledgment (ACK) message for the provision dynamic instantiation information message to the EAS management system 402.

In step 420, the EES 401 detects the occurrence of an event satisfying the instantiation trigger condition included in the dynamic EAS instantiation information received from the EAS management system 402. For example, when the instantiation trigger condition includes reception of an EEC registration request message, the EES 401 may determine whether the EEC registration request message has been received from the EEC. Upon receipt of the EEC registration request message from the EEC, the EES 401 may determine whether EAS-related information (e.g., AC profile information) is included in the EEC registration request message, and an EAS may be specified from the EAS-related information. In addition, when the instantiation trigger condition includes reception of an EAS discovery request, the EES 401 may determine whether an EAS discovery request message has been received from the EEC. Upon receipt of the EAS discovery request message from the EEC, the EES 401 may determine whether an EAS may be specified from information (e.g., EAS discovery filter information including an AC ID) included in the request message. In addition, when the instantiation trigger condition includes reception of an AC state report message, the EES 401 may determine whether an AC state report message has been received from the EEC. Upon receipt of the AC state report message from the EEC, the EES 401 may obtain AC state information included in the received AC state report message, and determine whether an AC is in a specific state.

In step 425, upon the occurrence of an event that satisfies the instantiation trigger condition included in the received EAS registration request message, the EES 401 transmits an EAS instantiation request message for the event to the EAS management system 402. The EAS instantiation request message may include EAS ID and/or AC ID information, and further include information about the satisfied instantiation trigger condition.

In step 430, the EAS management system 402 instantiates the EAS 403 requested by the EES 401 in step 425.

In step 435, the EAS management system 402 transmits an EAS instantiation response message including whether the instantiation is successful for the EAS 403 to the EES 401.

In step 440, the successfully instantiated EAS 403 performs an EAS registration procedure with the EES 401, provides EAS profile information to the EES 401, and enables an EAS discovery procedure.

Figure 5:
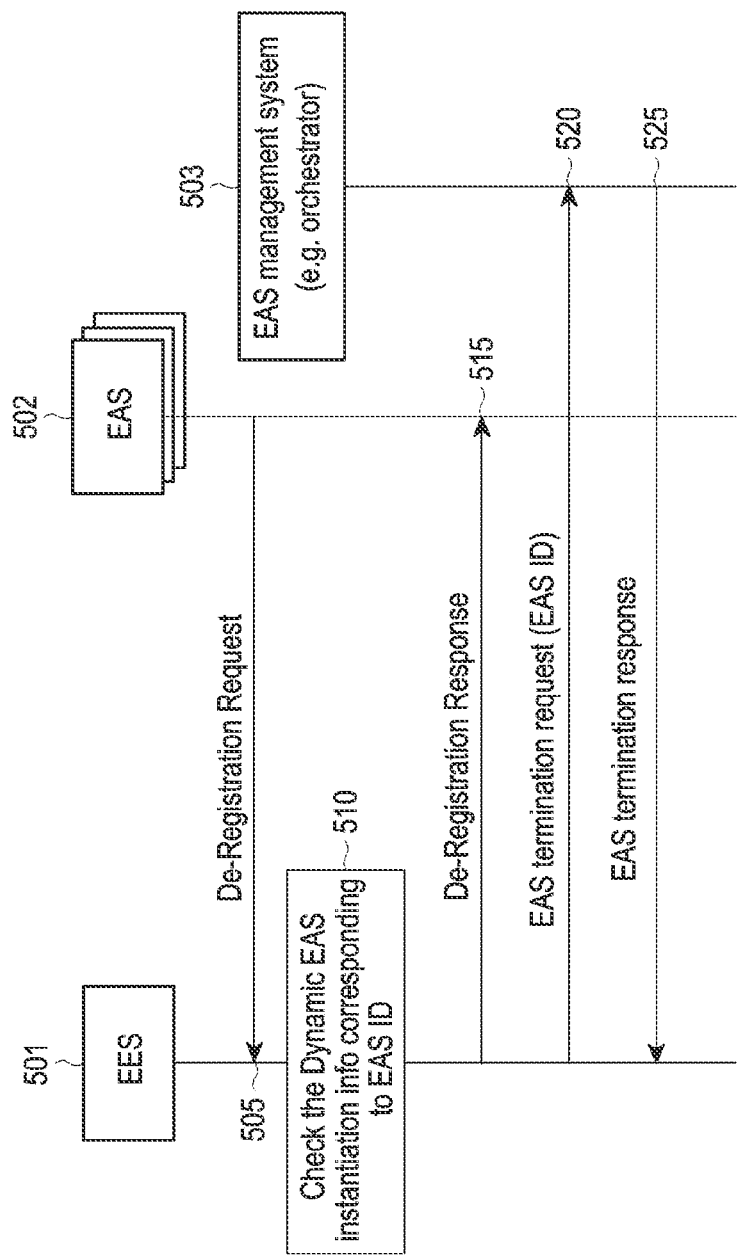
FIG. 5 illustrates an EAS termination triggering procedure caused by EAS de-registration, according to an embodiment.

FIG. 5 illustrates an EAS termination triggering procedure according to EAS de-registration, according to an embodiment.

Referring to FIG. 5, in step 505, an EAS 502 transmits an EAS de-registration request message to an EES 501, to stop driving and/or stop an EAS discovery procedure.

In step 510, upon receipt of the EAS de-registration request message from the EAS 502, the EES 501 identifies whether a termination trigger condition is included in dynamic EAS instantiation information received from the EAS 502 or an EAS management system 503 (e.g., an orchestrator, edge platform manager or EAS lifecycle manager) that manages the EAS 502. That is, the EES 501 identifies a registration ID in the EAS de-registration request message, specifies an EAS ID corresponding to the registration ID, and identifies whether dynamic EAS instantiation information corresponding to the specified EAS ID exists. Then, the EES 501 identifies whether the termination trigger condition included in the dynamic EAS instantiation information includes a condition for the case of reception of the EAS de-registration request message. When the EES 501 receives dynamic EAS instantiation information from both the EAS 502 and the EAS management system 503, the EFS 501 gives priority to policy/condition information received from the EAS management system 503.

In step 515, the EES 501 transmits an EAS de-registration response message indicating to the EAS 502 that EAS de-registration has been successfully performed. For example, the EES 501 performs a de-registration procedure for the EAS 502, when the termination trigger condition included in the dynamic EAS instantiation information identified in step 510 includes the condition for the case of reception of the EAS de-registration request message.

In step 520, the EES 501 that has successfully performed the EAS de-registration procedure transmits an EAS termination request message to the EAS management system 503. The EAS termination request message may include the EAS ID.

In step 525, the EAS management system 503 terminates EAS instance(s) corresponding to the EAS ID included in the EAS termination request message received from the EES 501, and transmits an EAS termination response message to the EES 501.

Figure 6:
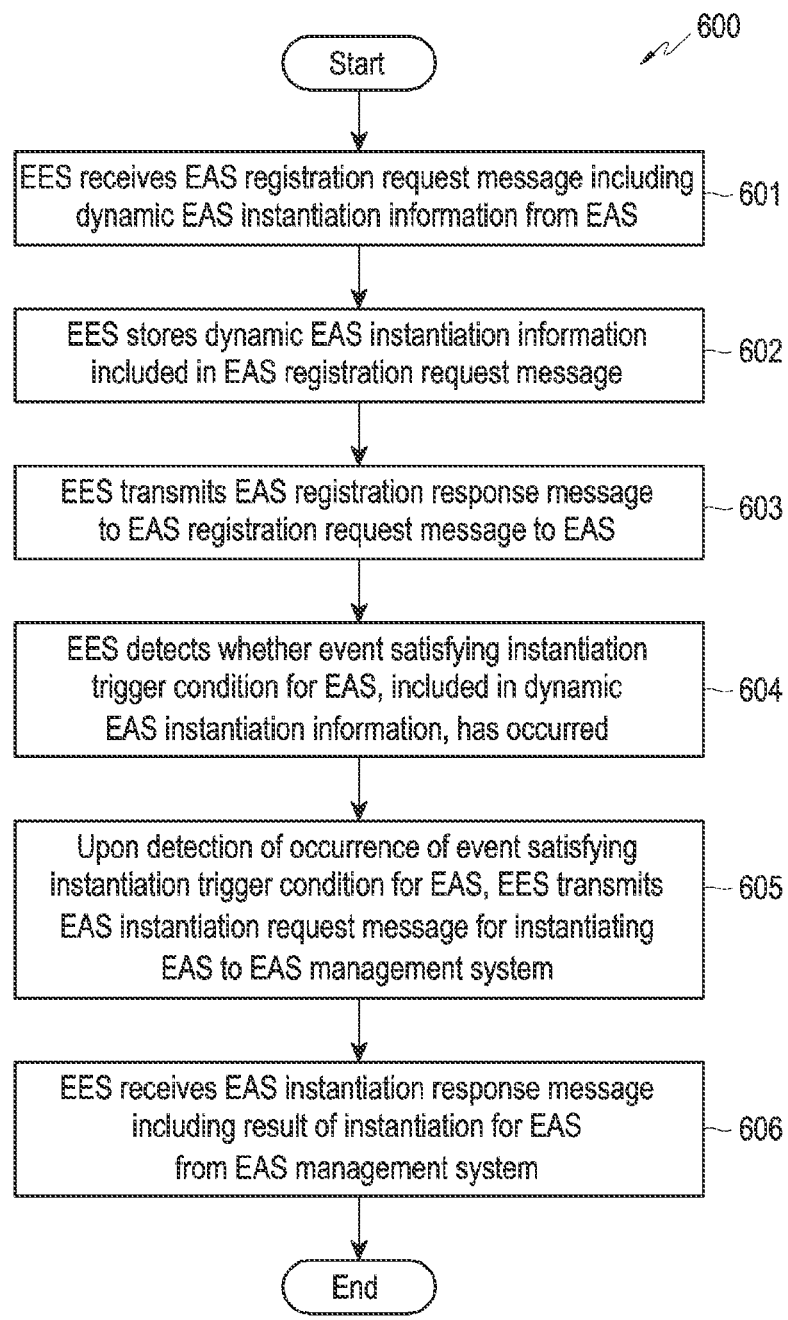
FIG. 6 illustrates a flowchart of a process of performing instantiation for an EAS by an EES, according to an embodiment.

FIG. 6 illustrates a flowchart of a process of performing instantiation for an EAS in an EES, according to an embodiment.

Referring to FIG. 6, in step 601, the EES receives an EAS registration request message including dynamic EAS instantiation information from the EAS. The dynamic EAS instantiation information included in the EAS registration request message may include at least one of a dynamic instantiation support indication, instantiation type information, an instantiation trigger condition, a max scaling out size, a termination trigger condition, EAS instantiation state information, or EAS management system information. The EAS registration request message may further include an EAS ID and/or an AC profile (e.g., an AC ID).

In step 602, the EES stores the dynamic EAS instantiation information included in the EAS registration request message. For example, the EES may store the dynamic EAS instantiation information by mapping it to the EAS ID or the AC ID.

In step 603, the EFS transmits an EAS registration response message to the EAS registration request message to the EAS.

In step 604, the EES detects whether an event satisfying the instantiation trigger condition for the EAS, included in the dynamic EAS instantiation information, has occurred. For example, when the instantiation trigger condition includes reception of an EEC registration request message, the EES determines whether the EEC registration request message has been received from an EEC. Upon receipt of the EEC registration request message from the EEC, the EES determines whether EAS-related information (e.g., AC profile information) is included in the EEC registration request message, and an EAS may be specified from the EAS-related information. In addition, when the instantiation trigger condition includes reception of an EAS discovery request, the EES determines whether the EAS discovery request message has been received from the EEC. Upon receipt of the EAS discovery request message from the EEC, the EES may determine whether an EAS may be specified from information (e.g., EAS discovery filter information including an AC ID) included in the discovery request message. In addition, when the instantiation trigger condition includes reception of an AC state report message, the EES may determine whether the AC state report message has been received from the EEC. Upon receipt of the AC state report message from the EEC, the EES may obtain AC state information included in the received AC state report message, and determine whether an AC is in a specific state.

In step 605, when the EES detects the occurrence of the event satisfying the instantiation trigger condition for the EAS, the EES transmits an EAS instantiation request message to an EAS management system to instantiate the EAS. For example, the EES may transmit the EAS instantiation request message to the EAS management system, only for an EAS for which dynamic instantiation is allowed/supported. When the EES receives an EAS discovery request message for an EAS for which dynamic instantiation is not supported, and the EAS has not been instantiated, the EES may explicitly indicate EAS discovery failure in a response message to the EAS discovery request, without transmitting the EAS instantiation request message to the EAS management system.

In step 606, the EES receives an EAS instantiation response message including an instantiation result for the EAS from the EAS management system. The instantiation result for the EAS may include at least one of whether the instantiation is successful, the EAS ID for which the instantiation is successful, the size or number of EAS instances, or a failure cause code in case of instantiation failure.

Figure 7:
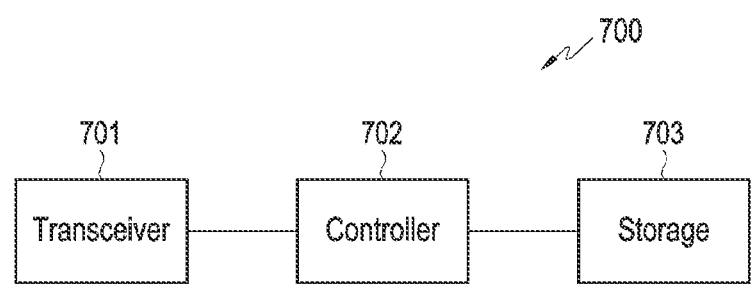
FIG. 7 is a block diagram illustrating the configuration of a network entity, according to an embodiment.

FIG. 7 is a block diagram illustrating the configuration of a network entity, according to an embodiment.

The network entity of FIG. 7 may be any of, for example, an EAS, an EES, an ECS, and an EAS management system.

Referring to FIG. 7, a network entity 700 communicating with another entity or a UE in a wireless communication system may include a transceiver 701, a controller 702, and a storage 703. The controller 702 may be defined as a circuit, an application-specific integrated circuit (ASIC), or at least one processor.

The transceiver 701 may transmit a signal to and receive a signal from another network entity. The transceiver 701 may, for example, receive dynamic EAS instantiation information from the other network entity, or transmit dynamic EAS instantiation information to the other network entity.

The controller 702 may provide overall control to the operations of the network entity 700 according to an embodiment. For example, the controller 702 may control a signal flow between blocks to perform an operation according to the procedures described above with reference to FIGS. 2 to 6. For example, the controller 702 may control the operations disclosed herein to perform instantiation for a specific EAS based on information about whether dynamic instantiation is supported for the specific EAS and an instantiation trigger condition according to the above-described embodiments.

The storage 703 may store at least one of information transmitted/received through the transceiver 701 or information generated through the controller 702. For example, the storage 703 may be a memory storing the dynamic EAS instantiation information according to the above-described embodiments.

While it has been described herein that an EAS or an EAS management system (an orchestrator, an edge platform manager, or an EAS lifecycle manager) directly provides dynamic EAS instantiation information to an EES, for convenience of description, an EAS provider, an edge infrastructure provider, an edge platform provider, and so on may provide the dynamic EAS instantiation information to the EES in various methods. For example, an edge computing policy device may exist in an edge computing system, an EAS provider and an edge infrastructure provider may register/generate dynamic EAS instantiation information in the edge computing policy device, and the EES may obtain the dynamic EAS instantiation information from the edge computing policy device. Further, when receiving the dynamic EAS instantiation information from both of the EAS provider and the edge infrastructure provider, the dynamic EAS instantiation information may be prioritized according to an order specified in a service level agreement between an EES provider and the edge infrastructure provider. Alternatively, unless otherwise specified, the EES may give priority to information received from the edge infrastructure provider. Alternatively, the prioritization of dynamic EAS instantiation information may be defined according to an edge computing policy, and priorities may be provided by the edge computing policy device.

According to an embodiment, the EES may identify whether dynamic instantiation is supported for all registered EASs, and when performing an EAS discovery procedure, provide information about an EAS that is not currently instantiated to an EAS discovery requesting device (an EEC or an EAS), based on the identification. Further, an instantiation trigger procedure may not be performed between the EES and the EAS management system, for an EAS for which dynamic instantiation support is not possible, thereby reducing signaling load.

According to an embodiment, as an EES calls a function of an EAS management system only when needed, based on information indicating whether dynamic instantiation for a specific EAS is supported and information about an instantiation trigger condition, signaling may be reduced.

According to an embodiment, an EES may perform a dynamic instantiation triggering operation based on an EAS instantiation policy/condition according to a service level agreement between an EAS provider and an EAS management system provider.

While a request-response model has been described as an information exchange model among an EAS, an EES, and an EAS management system in the disclosure, dynamic EAS instantiation information exchange through a subscription-notification model may also fall within the scope of the disclosure.

The afore-described operations of a BS and a UE may be implemented by providing a memory device storing a corresponding program code in an arbitrary component in the BS or the UE. That is, the controller of the BS or the UE may perform the afore-described operations by reading and executing the program code stored in the memory device by a processor or a central processing unit (CPU).

Various components and modules of an entity, a BS, or a UE described herein may be operated using a hardware circuit, for example, a complementary metal oxide semiconductor-based logic circuit, firmware, software, and/or a combination of hardware and firmware and/or software embedded in a machine-readable medium. For example, various electrical structures and methods may be implemented using electrical circuits such as transistors, logic gates, and application-specific semiconductors.

While specific embodiments have been described in the detailed description of the disclosure, it is obvious that various modifications can be made without departing from the scope of the disclosure. Therefore, the scope of the disclosure should be defined by the appended claims and their equivalents, and not limited to the described embodiments.

What is claimed is:
1. A method of an edge enabler server (EES), comprising:
   receiving, from an edge application server (EAS) management system, a first message including dynamic EAS instantiation information about one or more EASs; and receiving an edge enabler client (EEC) registration request message including application client (AC) profile information from the EEC; and transmitting, to the EAS management system, a second message for instantiating at least one EAS among the one or more EASs, based on the dynamic EAS instantiation information and the AC profile information, wherein the dynamic EAS instantiation information includes at least one of information about an identifier (ID) of each of the one or more EASs that can be instantiated.

2. The method of claim 1, wherein the dynamic EAS instantiation information further includes a dynamic instantiation support indication indicating whether each of the one or more EASs supports instantiation, and instantiation type information, wherein the instantiation type information includes on-demand type information for real-time EAS instantiation and additional information corresponding to the on-demand type information, and wherein the additional information includes at least one of information about a first trigger condition for transmitting the second message, information about a maximum number of EASs for which instantiation is possible, or information about a second trigger condition for terminating instantiation for at least one EAS.

3. The method of claim 2, wherein the instantiation type information includes auto scaling type information for instantiation based on a set schedule, and additional information corresponding to the auto scaling type information, and wherein the additional information includes information about a number of EASs for which instantiation is possible on a time basis.

4. The method of claim 1, wherein the dynamic EAS instantiation information further includes instantiation state information about each of the one or more EASs, and wherein the instantiation state information includes one of first state information indicating that no generated instance exists for the EAS among the one or more EASs, second state information indicating that the EAS is in an enabled for instantiation state, and third information indicating a state in which a generated instance exists for the EAS.

5. The method of claim 1, further comprising:

receiving, from the EAS management system, a third message indicating whether the instantiation for the at least one EAS is successful, in response to the second message; and in response to the third message indicating that the instantiation for the at least one EAS is successful, registering the instantiated at least one EAS.

6. A method of an edge application server (EAS) management system, comprising:

transmitting, to an edge enabler server (EES), a first message including dynamic EAS instantiation information about one or more EASs; and receiving, from the EES, a second message for requesting instantiation for at least one EAS among the one or more EASs, based on the dynamic EAS instantiation information, wherein the dynamic EAS instantiation information includes at least one of information about an identifier (ID) of each of the one or more EASs that can be instantiated, and wherein the second message is transmitted by the EES based on the EES receiving an edge enabler client (EEC) registration request message including application client (AC) profile information.

7. The method of claim 6, wherein the dynamic EAS instantiation information further includes a dynamic instantiation support indication indicating whether each of the one or more EASs supports instantiation, and instantiation type information, wherein the instantiation type information includes on-demand type information for real-time EAS instantiation and additional information corresponding to the on-demand type information, and wherein the additional information includes at least one of information about a first trigger condition for transmitting the second message, information about a maximum number of EASs for which instantiation is possible, or information about a second trigger condition for terminating instantiation for at least one EAS.

8. The method of claim 7, wherein the instantiation type information includes auto scaling type information for instantiation based on a set schedule, and additional information corresponding to the auto scaling type information, and wherein the additional information includes information about a number of EASs for which instantiation is possible on a time basis.

9. The method of claim 6, wherein the dynamic EAS instantiation information further includes instantiation state information about each of the one or more EASs, and wherein the instantiation state information includes one of first state information indicating that no generated instance exists for the EAS among the one or more EASs, second state information indicating that the EAS is in an enabled for instantiation state, and third information indicating a state in which a generated instance exists for the EAS.

10. The method of claim 6, further comprising:

performing instantiation for the at least one EAS in response to the second message; and transmitting, to the EES, a third message indicating whether the instantiation for the at least one EAS is successful, based on a result of the instantiation.

11. An edge enabler server (EES) comprising:

a transceiver; and at least one processor configured to:

control the transceiver to receive, from an edge application server (EAS) management system, a first message including dynamic EAS instantiation information about one or more EASs, receive an edge enabler client (EEC) registration request message including application client (AC) profile information from the EEC; and control the transceiver to transmit, to the EAS management system, a second message for instantiating at least one EAS among the one or more EASs, based on the dynamic EAS instantiation information and the AC profile information, wherein the dynamic EAS instantiation information includes at least one of information about an identifier (ID) of each of the one or more EASs that can be instantiated.

12. The EES of claim 11, wherein the dynamic EAS instantiation information further includes a dynamic instantiation support indication indicating whether each of the one or more EASs supports instantiation, and instantiation type information, wherein the instantiation type information includes on-demand type information for real-time EAS instantiation and additional information corresponding to the on-demand type information, and wherein the additional information includes at least one of information about a first trigger condition for transmitting the second message, information about a maximum number of EASs for which instantiation is possible, or information about a second trigger condition for terminating instantiation for at least one EAS.

13. The EES of claim 12, wherein the instantiation type information includes auto scaling type information for instantiation based on a set schedule, and additional information corresponding to the auto scaling type information, and wherein the additional information includes information about a number of EASs for which instantiation is possible on a time basis.

14. The EES of claim 11, wherein the dynamic EAS instantiation information further includes instantiation state information about each of the one or more EASs, and wherein the instantiation state information includes one of first state information indicating that no generated instance exists for the EAS among the one or more EASs, second state information indicating that the EAS is in an enabled for instantiation state, and third information indicating a state in which a generated instance exists for the EAS.

15. The EES of claim 11, wherein the at least one processor is further configured to control the transceiver to receive, from the EAS management system, a third message indicating whether the instantiation for the at least one EAS is successful, in response to the second message, and in response to the third message indicating that the instantiation for the at least one EAS is successful, register the instantiated at least one EAS.

16. An edge application server (EAS) management system comprising:

a transceiver; and at least one processor configured to:

transmit, to an edge enabler server (EES), a first message including dynamic EAS instantiation information about one or more EASs, and receive, from the EES, a second message for requesting instantiation for at least one EAS among the one or more EASs, based on the dynamic EAS instantiation information, wherein the dynamic EAS instantiation information includes at least one of information about an identifier (ID) of each of the one or more EASs that can be instantiated, and wherein the second message is transmitted by the EES based on the EES receiving an edge enabler client (EEC) registration request message including application client (AC) profile information.

17. The EAS management system of claim 16, wherein the dynamic EAS instantiation information further includes a dynamic instantiation support indication indicating whether each of the one or more EASs supports instantiation, and instantiation type information, wherein the instantiation type information includes on-demand type information for real-time EAS instantiation and additional information corresponding to the on-demand type information, and wherein the additional information includes at least one of information about a first trigger condition for transmitting the second message, information about a maximum number of EASs for which instantiation is possible, or information about a second trigger condition for terminating instantiation for at least one EAS.

18. The EAS management system of claim 17, wherein the instantiation type information includes auto scaling type information for instantiation based on a set schedule, and additional information corresponding to the auto scaling type information, and wherein the additional information includes information about a number of EASs for which instantiation is possible on a time basis.

19. The EAS management system of claim 16, wherein the dynamic EAS instantiation information further includes instantiation state information about each of the one or more EASs, and wherein the instantiation state information includes one of first state information indicating that no generated instance exists for the EAS among the one or more EASs, second state information indicating that the EAS is in an enabled for instantiation state, and third information indicating a state in which a generated instance exists for the EAS.

20. The EAS management system of claim 16, wherein the at least one processor is further configured to perform instantiation for the at least one EAS in response to the second message, and control the transceiver to transmit, to the EES, a third message indicating whether the instantiation for the at least one EAS is successful, based on a result of the instantiation.

* * * * *